US006988556B2

(12) United States Patent
Vick, Jr.

(10) Patent No.: US 6,988,556 B2
(45) Date of Patent: Jan. 24, 2006

(54) DEEP SET SAFETY VALVE

(75) Inventor: James D. Vick, Jr., Dallas, TX (US)

(73) Assignee: Halliburton Energy Services, Inc., Houston, TX (US)

(*) Notice: Subject to any disclaimer, the term of this patent is extended or adjusted under 35 U.S.C. 154(b) by 88 days.

(21) Appl. No.: 10/078,839

(22) Filed: Feb. 19, 2002

(65) Prior Publication Data

US 2003/0155131 A1 Aug. 21, 2003

(51) Int. Cl.
*E21B 23/04* (2006.01)
*E21B 34/10* (2006.01)

(52) U.S. Cl. .................. 166/375; 166/386; 166/66.5; 166/66.7; 166/332.8

(58) Field of Classification Search .......... 168/386, 168/316, 319, 320, 332.1; 166/373, 374, 166/375, 381, 65.1, 66.5, 66.6, 66.7, 325, 166/332.1, 332.8
See application file for complete search history.

(56) References Cited

U.S. PATENT DOCUMENTS

| | | | |
|---|---|---|---|
| 3,196,948 A | | 7/1965 | Dye |
| 3,666,030 A | | 5/1972 | Bohn et al. |
| 3,731,742 A | * | 5/1973 | Sizer et al. ............. 166/375 |
| 4,058,166 A | | 11/1977 | Crickmer |
| RE30,110 E | * | 10/1979 | Huebsch et al. ........... 166/66.7 |
| 4,191,248 A | * | 3/1980 | Huebsch et al. ........... 166/66.7 |
| 4,407,329 A | * | 10/1983 | Huebsch et al. ........... 137/629 |
| 4,467,870 A | | 8/1984 | Langham |
| 4,579,177 A | * | 4/1986 | Going, III ............. 166/66.5 |
| 4,619,323 A | | 10/1986 | Gidley |
| 4,649,993 A | | 3/1987 | Going, III |
| 4,667,736 A | | 5/1987 | Rumbaugh et al. |
| 4,725,783 A | | 2/1988 | Miyairi et al. |
| 4,732,225 A | | 3/1988 | Jurgens et al. |
| 4,796,708 A | | 1/1989 | Lembcke |
| 4,798,247 A | * | 1/1989 | Deaton et al. ............. 166/66.7 |
| 4,886,114 A | | 12/1989 | Perkins et al. |
| 4,940,207 A | | 7/1990 | Katsuyama |
| 4,981,173 A | * | 1/1991 | Perkins et al. ............. 166/66.7 |
| 5,070,595 A | * | 12/1991 | Perkins et al. ............. 29/602.1 |
| 5,070,944 A | | 12/1991 | Hopper |

(Continued)

FOREIGN PATENT DOCUMENTS

| | | |
|---|---|---|
| EP | 0436214 | 2/1996 |
| EP | 0997676 | 10/1999 |
| GB | 2186667 A | 8/1987 |
| GB | 2200775 A | 8/1988 |
| GB | 2241302 A | 8/1991 |
| GB | 2362407 A | 11/2001 |
| GB | 2379562 A | 3/2003 |
| GB | 2390750 A | 1/2004 |
| JP | 110093883 A | 4/1995 |
| WO | WO 00/53890 A1 | 9/2000 |

OTHER PUBLICATIONS

Search Report for GB 0303480.8.

(Continued)

*Primary Examiner*—David Bagnell
*Assistant Examiner*—Jennifer H Gay
(74) *Attorney, Agent, or Firm*—Marlin R. Smith

(57) ABSTRACT

Apparatus and methods are provided for actuation of downhole tools. In one example, a deep set safety valve uses a magnetic coupling which permits a portion of the safety valve at control line pressure to be isolated from tubing string internal pressure, without requiring the use of a dynamic seal therebetween. A piston of the safety valve may be displaced in response to a differential between control line pressure and pressure in an annulus surrounding the tubing string, pressure in another control line, or pressure in the tubing string. Other types of well tools may benefit from actuation using principles of the invention.

64 Claims, 12 Drawing Sheets

U.S. PATENT DOCUMENTS

| | | | |
|---|---|---|---|
| 5,257,663 A | | 11/1993 | Pringle et al. |
| 5,291,947 A | | 3/1994 | Stracke |
| 5,293,551 A | | 3/1994 | Perkins et al. |
| 5,299,640 A | | 4/1994 | Streich et al. |
| 5,310,012 A | | 5/1994 | Cendre et al. |
| 5,409,031 A | | 4/1995 | McGill et al. |
| 5,558,153 A | * | 9/1996 | Holcombe et al. .......... 166/373 |
| 5,620,048 A | * | 4/1997 | Beauquin ..................... 166/62 |
| 5,734,209 A | | 3/1998 | Hallidy |
| 5,913,337 A | | 6/1999 | Williams et al. |
| 5,917,774 A | | 6/1999 | Walkow et al. |
| 6,016,845 A | | 1/2000 | Quigley et al. |
| 6,041,857 A | | 3/2000 | Carmody et al. |
| 6,112,809 A | | 9/2000 | Angle |
| 6,237,693 B1 | * | 5/2001 | Deaton ........................ 166/375 |
| 6,253,843 B1 | | 7/2001 | Rawson et al. |
| 6,302,210 B1 | | 10/2001 | Crow et al. |
| 6,321,845 B1 | * | 11/2001 | Deaton ........................ 166/363 |
| 6,352,118 B1 | * | 3/2002 | Dickson et al. ............. 166/373 |
| 6,361,299 B1 | | 3/2002 | Quigley et al. |
| 6,433,991 B1 | * | 8/2002 | Deaton et al. ............... 361/191 |
| 6,478,090 B2 | * | 11/2002 | Deaton ........................ 166/363 |
| 6,491,106 B1 | | 12/2002 | Simonds |
| 6,568,470 B2 | * | 5/2003 | Goodson et al. ........... 166/66.5 |
| 6,619,388 B2 | * | 9/2003 | Dietz et al. ................. 166/66.7 |
| 6,626,244 B2 | * | 9/2003 | Powers ........................ 166/373 |
| 2002/0023759 A1 | * | 2/2002 | Deaton ........................ 166/381 |
| 2002/0108747 A1 | * | 8/2002 | Dietz et al. ................. 166/66.7 |
| 2002/0112861 A1 | | 8/2002 | Restarick et al. |
| 2003/0019622 A1 | * | 1/2003 | Goodson et al. ........... 166/66.5 |
| 2003/0132003 A1 | | 7/2003 | Arauz et al. |

OTHER PUBLICATIONS

U.S. Appl. No. 09/784,723, filed Feb. 15, 2001.
Festo Pneumatic Products Catalog, 2nd Edition, p. 1.292, "Double–Acting Rodless Cylinder Type DGO–. . . –PPV–A", dated 1986.
Permanent Magnet Design and Application Handbook, 2nd Edition, p. 9 & 21, dated 1995.
Halliburton Completion Products Catalog, pp. 4–6 & 4–7. dated 1996.
Office Action for Ser. No. 10/990,748 dated Apr. 15, 2005.
Examination report for GB0303480.8.
Search Report for GB 0303480.8.

* cited by examiner

DEEP SET SAFETY VALVE

BACKGROUND

The present invention relates generally to operations performed and equipment utilized in conjunction with a subterranean well and, in an embodiment described herein, more particularly provides a deep set safety valve.

It is sometimes desirable to set a safety valve relatively deep in a well. For example, a safety valve may be set at a depth of approximately 10,000 ft. However, operating a safety valve at such depths presents a variety of problems which tend to require expensive measures to overcome.

For example, a typical safety valve is operated by displacing a piston of the safety valve in response to a differential between pressure in a control line connected to the safety valve and pressure in a tubing string in which the safety valve is interconnected. In such situations, the control line is generally designed to withstand a pressure in excess of the greatest pressure predicted in the tubing string, plus a pressure needed to compress a biasing device, such as a spring. This usually requires a relatively high pressure rating for the control line, which significantly increases the cost of the safety valve installation, particularly in subsea environments where the control line may extend for many thousands of feet along the seabed.

Another problem associated with use of this type of deep set safety valve is the presence of a dynamic seal between portions of the valve at control line pressure and portions of the valve at tubing string internal pressure. A leak past the dynamic seal could possibly permit well fluids (such as liquid hydrocarbons or gas) in the tubing string to enter the control line.

One proposed solution is to use a second control line to balance the pressure in the other control line. In this type of safety valve, the piston displaces in response to a differential between pressures in the two control lines. This significantly eliminates the consideration of tubing string internal pressure in calculating the required pressure rating of the control line for normal operation of the valve. However, this method requires the installation of two control lines, which is very costly.

This type of safety valve also typically has one or more dynamic seals isolating the tubing string internal pressure from portions of the safety valve at control line pressure. Thus, the control lines are generally required to withstand the tubing string internal pressure for safety reasons, in case a leak past one of the dynamic seals occurs.

Another proposed solution is to use a safety valve which includes a gas chamber charged to a predetermined pressure. The piston of the safety valve displaces in response to a differential between control line pressure and the gas chamber pressure. This method also substantially eliminates the consideration of tubing string internal pressure in the control line pressure rating for normal operation of the valve, but this type of safety valve also uses dynamic seals to separate portions of the valve at tubing string internal pressure from portions at control line pressure and/or gas chamber pressure.

SUMMARY

In carrying out the principles of the present invention, in accordance with embodiments thereof, apparatus and methods are provided which solve one or more of the above problems in the art of deep set safety valve operation and installation. Principles of the present invention are also applicable to other types of well tools which are actuated downhole.

In one aspect of the invention, an improved safety valve is provided. The safety valve includes a piston, an operating member and a magnetic coupling. The piston displaces in response to a differential between pressure in a hydraulic line connected to the safety valve, and pressure in an annulus surrounding the safety valve. The operating member displaces to open and close the safety valve. The magnetic coupling translates piston displacement into operating member displacement to thereby actuate the safety valve.

In another aspect of the invention, a method of actuating a safety valve is provided. The method includes the steps of displacing a piston of the safety valve in response to a differential between pressure in a hydraulic line connected to the safety valve and pressure in an annulus surrounding the safety valve, translating displacement of the piston to displacement of an operating member, the translation being performed across a rigid pressure isolation barrier without the use of any dynamic seal, and actuating the safety valve between open and closed positions in response to displacement of the operating member.

In yet another aspect of the invention, a well tool is provided which includes an actuator and an operating member. The actuator includes a piston which displaces in response to a first pressure applied to the piston. The operating member has a second pressure applied thereto and displaces to operate the well tool. Displacement of the piston is translated into displacement of the operating member while the first and second pressures are isolated from each other, and without the use of any dynamic seal between the piston and the operating member.

In a further aspect of the invention, a method of actuating a well tool in a well is provided. The method includes the steps of displacing an actuator member of the well tool, translating displacement of the actuator member to displacement of an operating member by use of a magnetic coupling therebetween, and actuating the well tool in response to displacement of the operating member.

In a still further aspect of the invention, a well tool is provided which includes an actuator, first and second magnets, and a pressure barrier between the first and second magnets.

The first magnet is attached to the actuator and is positioned in a first portion of the well tool at a first pressure. The actuator displaces the first magnet. The second magnet is attached to an operating member and is positioned in a second portion of the well tool at a second pressure. The pressure barrier isolates the first and second pressures.

The well tool is operated in response to displacement of the operating member. Displacement of the first magnet on a first side of the barrier causes displacement of the second magnet on a second side of the barrier, thereby displacing the operating member and actuating the well tool.

These and other features, advantages, benefits and objects of the present invention will become apparent to one of ordinary skill in the art upon careful consideration of the detailed description of representative embodiments of the invention below and the accompanying drawings.

DETAILED DESCRIPTION

Figure 1:
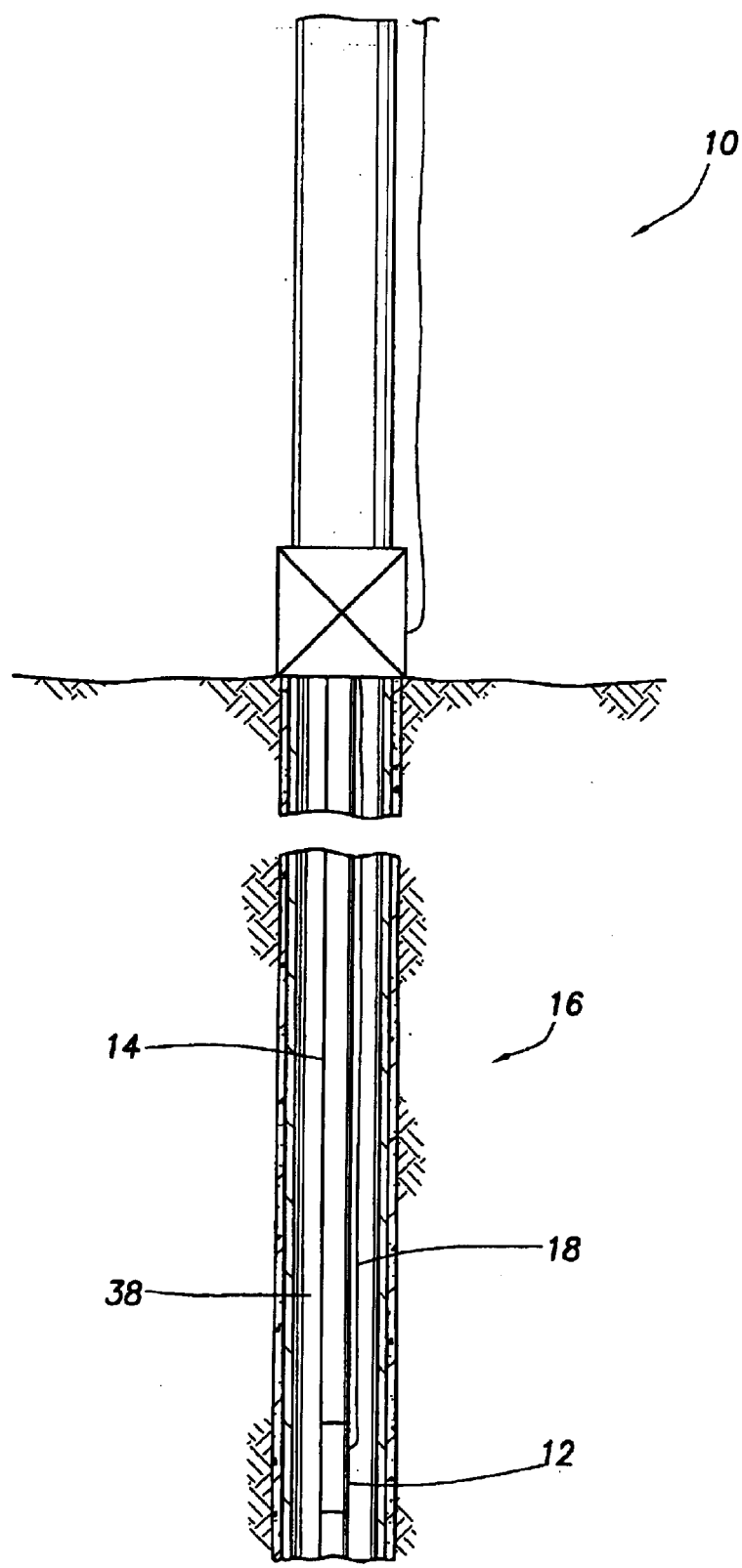
FIG. 1 is a partially cross-sectional view of a method embodying principles of the present invention.

Representatively illustrated in FIG. 1 is a method 10 which embodies principles of the present invention. In the following description of the method 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

In the method 10, a safety valve 12 is interconnected in a tubing string 14 and is positioned relatively deep in a subsea well 16. A control line 18 extends into the well 16 and is connected to the safety valve 12. The control line 18 is used to actuate the safety valve 12, for example, to maintain the safety valve in an open position, and to close the safety valve to prevent a blowout in the event of an emergency.

The well 16 is depicted in FIG. 1 as a subsea well, but principles of the invention may be incorporated in methods used at land-based wells also. Thus, the invention is not limited to any particular type of well.

In this example, the control line 18 is a hydraulic control line. Pressure is applied to the control line 18 at a remote location, such as a production platform or a subsea control station, to maintain the safety valve 12 in its open position. To close the safety valve 12, pressure in the control line 18 is reduced.

It should be understood, however, that other means may be used to control actuation of the safety valve 12, in keeping with the principles of the invention. For example, the safety valve 12 could be electrically actuated, in which case the control line 18 could be one or more electrical or fiber optic lines. The safety valve 12 could be actuated using telemetry, such as mud pulse, acoustic, electromagnetic, seismic or any other type of telemetry. The safety valve 12 could be actuated using any type of surface or downhole power source.

In addition, it should be understood that the deep set safety valve 12 is used in the method 10 merely as an example of a type of well tool which may be actuated using the principles of the invention. Further examples are depicted in FIGS. 5–8 and are described below. Many other embodiments are possible.

In conventional practice, an umbilical for a subsea well includes two control lines. One is rated to withstand a relatively low hydraulic pressure (for example, 3,000 psi), and the other is rated to withstand a relatively high hydraulic pressure (for example, 10,000 psi). If a deep set safety valve may use a control line in such a standard umbilical, then there is no need to install a special, expensive, very high pressure rated control line. Therefore, it is beneficial to be able to reduce the pressure applied to the control line 18 to actuate the safety valve 12 in the method 10.

Although the control line 18 is depicted in FIG. 1 as being external to the tubing string 14, it will be readily appreciated that any hydraulic line may be used to convey actuation pressure to the safety valve 12. For example, the hydraulic line could be internal to the tubing string 14, or formed in a sidewall of the tubing string. The hydraulic line could extend from a remote location, such as the earth's surface, or another location in the well 16, etc., or the actuation pressure could be generated by a pump or other pressure generation device attached to the safety valve 12.

Referring additionally now to FIGS. 2A–E, the safety valve 12 is depicted in successive quarter-sectional views. The safety valve 12 is used in the method 10 as described above, but it is to be understood that the safety valve, as well as other well tools described herein, may be used in other methods in keeping with the principles of the invention.

The safety valve 12 has an outer housing assembly 22 with upper and lower connectors 24, 26 for interconnecting the safety valve 12 in the tubing string 14. A control line port 28 is provided for connecting the control line 18 to the safety valve 12.

Figure 2A:
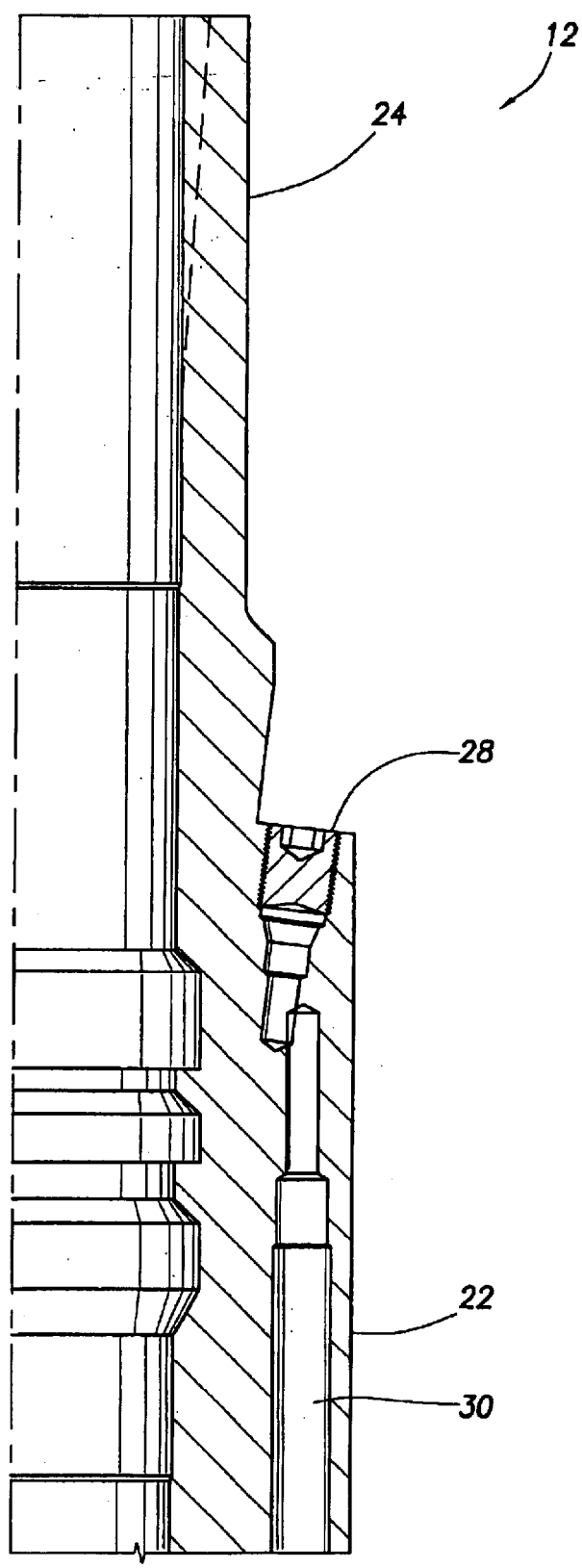
FIGS. 2A–E are enlarged scale quarter-sectional views of successive axial sections of a safety valve embodying principles of the invention.
Figure 2B:
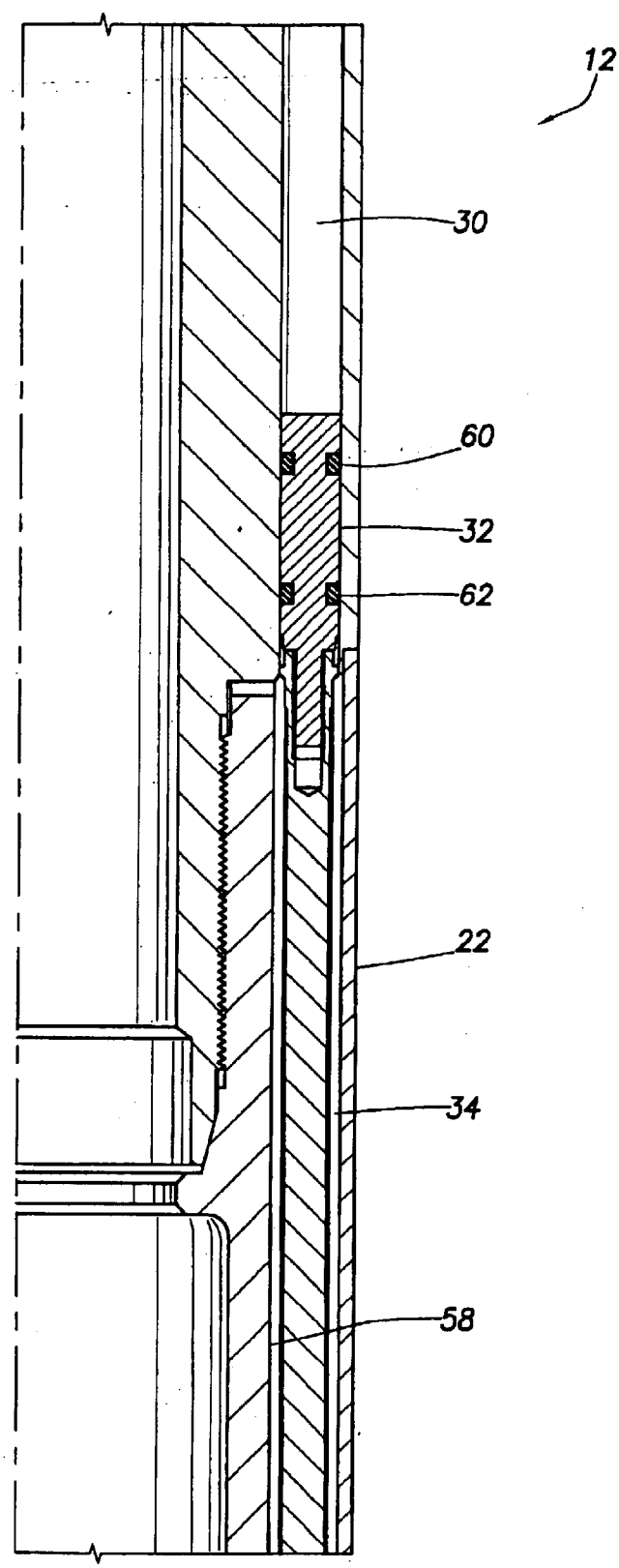

Although the port 28 is plugged as shown in FIG. 2A, when the control line 18 is connected to the port, the control line is placed in communication with an internal chamber 30 above a rod piston 32. Although a single rod piston 32 is depicted in FIG. 2B, it should be understood that any type and any number of pistons may be used, such as multiple rod pistons, or an annular piston, etc.

The lower side of the piston 32 is in communication with another chamber 34. The chamber 34 is in communication via an opening 36 with an annulus 38 surrounding the tubing string 14 in the well 16. Thus, the piston 32 is responsive to a differential between pressure in the control line 18 and pressure in the annulus 38.

A spring 40 in the lower chamber 34 biases the piston 32 upwardly. When the differential between control line pressure and annulus pressure acting on the piston 32 exceeds the upwardly biasing force of the spring 40, the piston 32 displaces downwardly. When the upwardly biasing force of the spring 40 exceeds the force due to the pressure differential acting on the piston 32, the piston displaces upwardly.

Figure 2C:
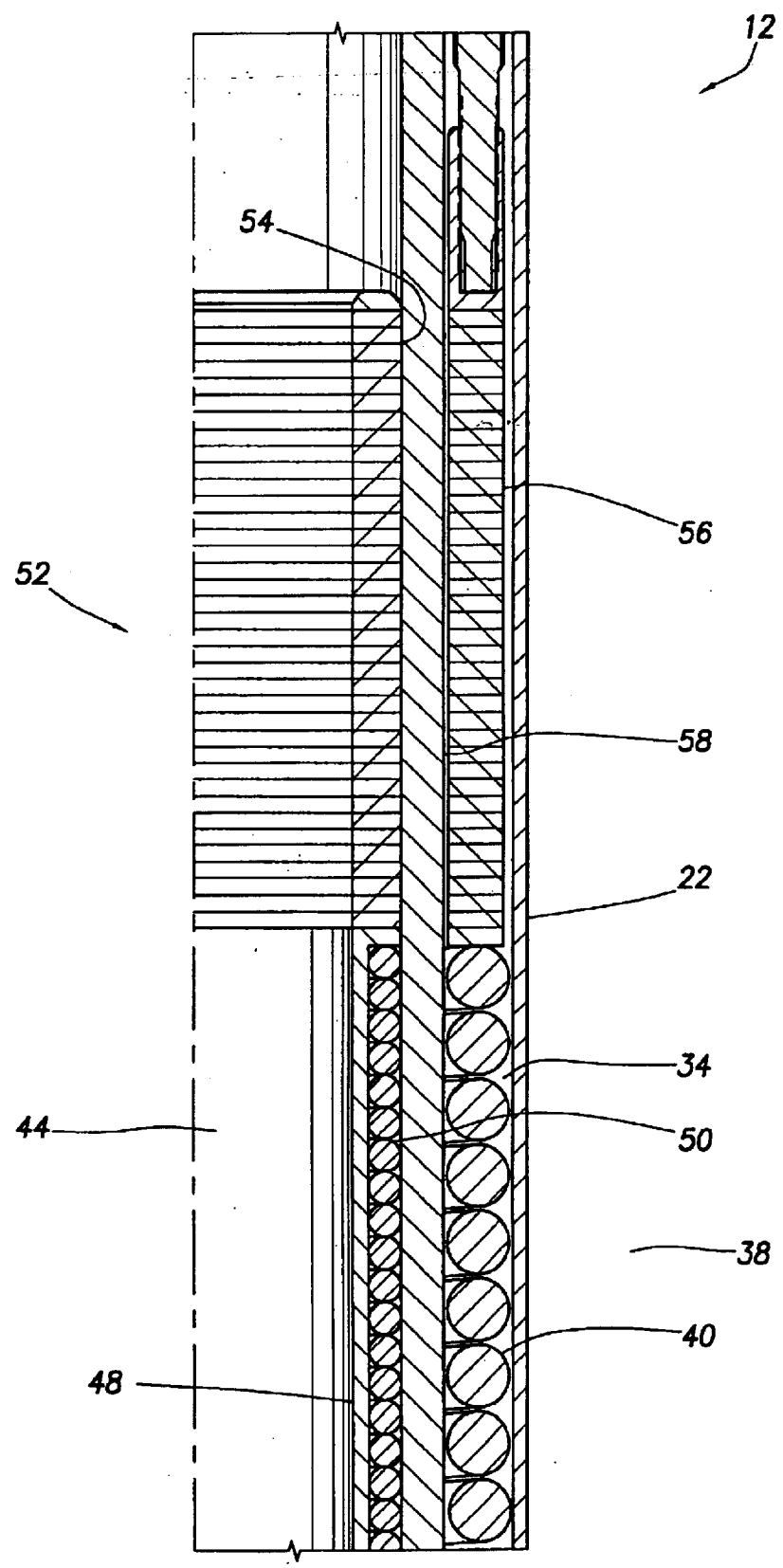
Figure 2D:
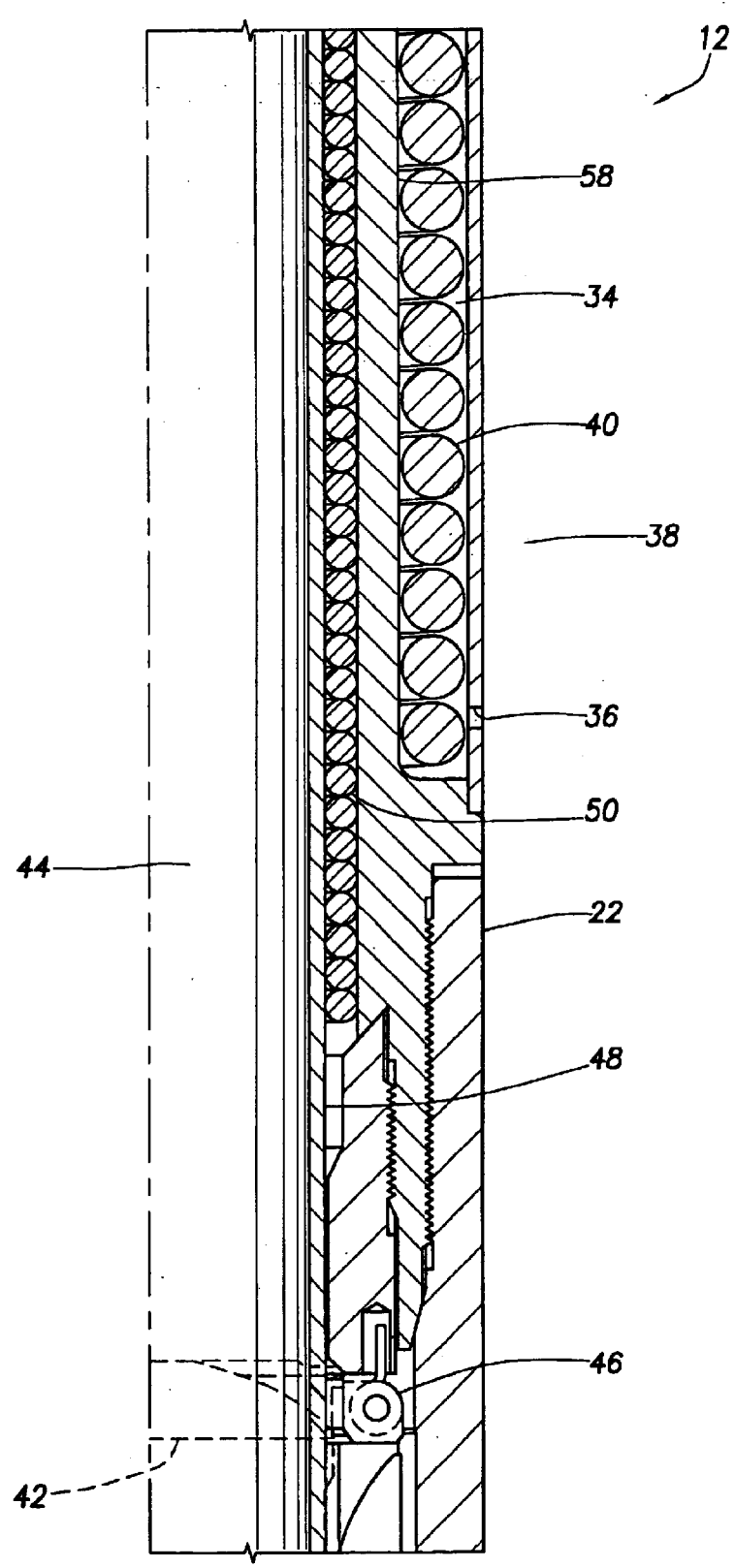
Figure 2E:
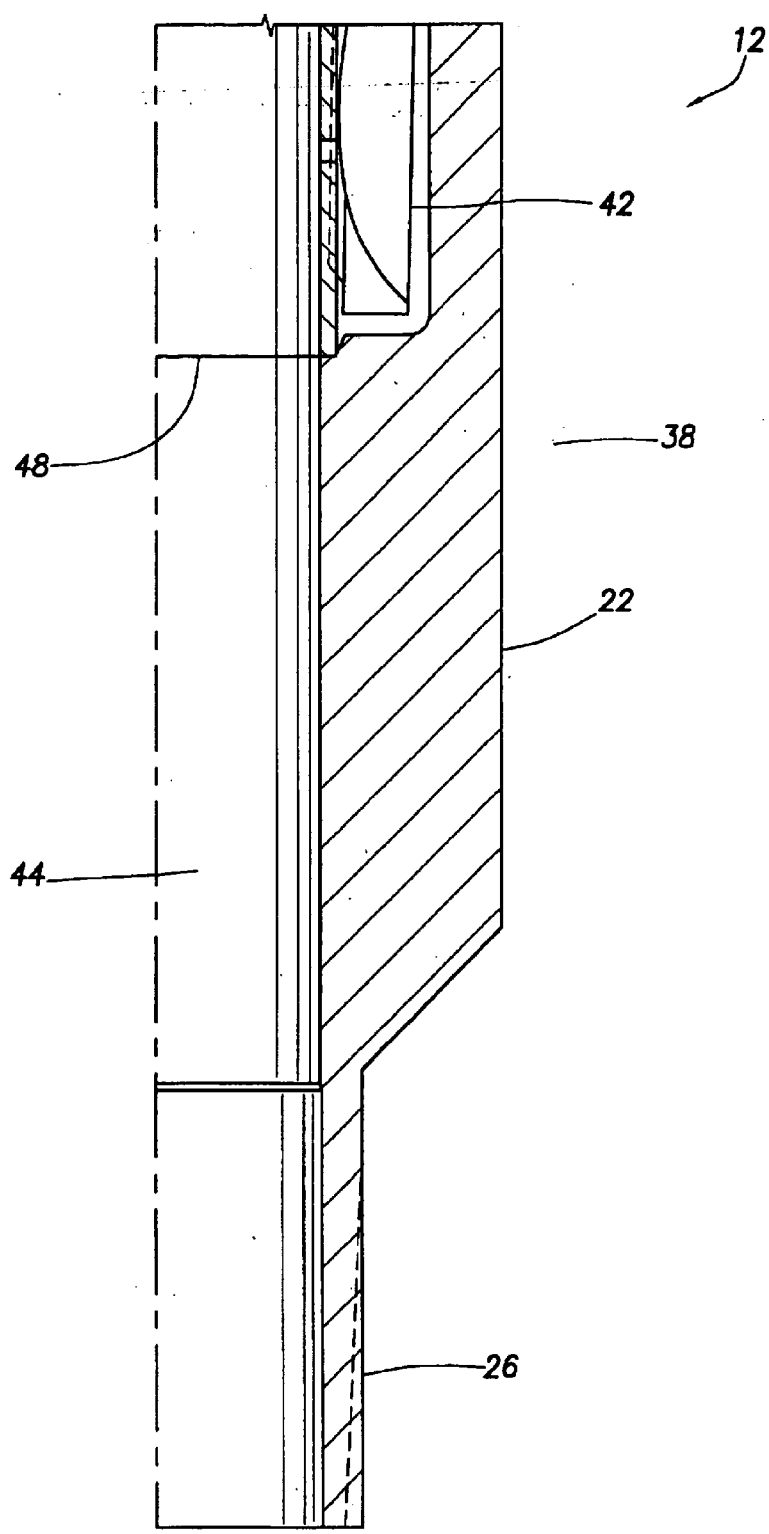

The spring 40 depicted in FIGS. 2C & D is a coiled compression spring, but any type of biasing device may be used instead, or in addition. For example, a compressed gas, such as Nitrogen, may be used in place of the spring 40. If a compressed gas is used, it may be contained in the chamber 34, in which case the lower side of the piston 32 may be exposed directly to the compressed gas, and the opening 36 may not be provided, so that the chamber 34 is isolated from pressure in the annulus 38. Alternatively, the compressed gas may be contained in a separate chamber, in which case pressure in the annulus 38 may still act on the piston 32.

The safety valve 12 is of the type which uses a flapper 42 to selectively open and close a flow passage 44 extending axially through the safety valve. The flapper is shown in its open position in FIGS. 2D & E, and is shown in its closed position in dashed lines in FIG. 2D. A torsion spring 46 biases the flapper 42 to pivot to its closed position.

A tubular opening prong 48 is used to displace the flapper 42 between its open and closed positions, and to protect the seal surfaces from damage. As depicted in the drawings, the opening prong is in its downward position in which it has displaced the flapper 42 to its open position. Upward displacement of the opening prong 48 will permit the flapper to rotate to its closed position.

A spring 50 is provided to bias the opening prong 48 toward its upward position. However, since the position of the opening prong 48 is fixed to the position of the piston 32, as described in detail below, use of the spring 50 is not necessary.

Although the safety valve 12 is depicted as being a flapper-type safety valve, note that any type of safety valve may be constructed to embody principles of the invention. For example, the safety valve 12 could instead be a ball-type safety valve, or a sleeve-type safety valve, etc.

The position of the opening prong 48 with respect to the piston 32 is fixed by means of a magnetic coupling 52. The magnetic coupling 52 includes a series of annular permanent magnets 54 attached to the opening prong 48, and a second set of annular permanent magnets 56 attached to the piston 32. Although the magnets 54 are depicted as being exposed to the inner passage 44 and the magnets 56 are depicted as being exposed to the chamber 34, the magnets may be suitably isolated with appropriate packaging in actual practice.

The magnets 54, 56 are preferably constructed and arranged so that their poles are appropriately aligned to maximize the magnetic attraction therebetween. Any number of magnets 54, 56 may be used to generate a sufficient magnetic attraction, so that, as the piston 32 and magnets 56 displace upwardly and downwardly, the magnets 54 and opening prong 48 displace therewith.

As used herein, the term "magnet" indicates those materials and devices which are used to generate a magnetic field. Magnets include materials such as permanent and temporary magnetic materials. Magnets also include devices, such as electromagnets, used to generate magnetic fields.

Instead of using two stacks of annular magnets 54, 56, the magnetic coupling 52 could include other types of magnetic devices. For example, the magnet 56 could be an electromagnet. The magnet 54 could be a ferrous material which is induced to displace in response to the magnetic field generated by the electromagnet.

Figure 9:
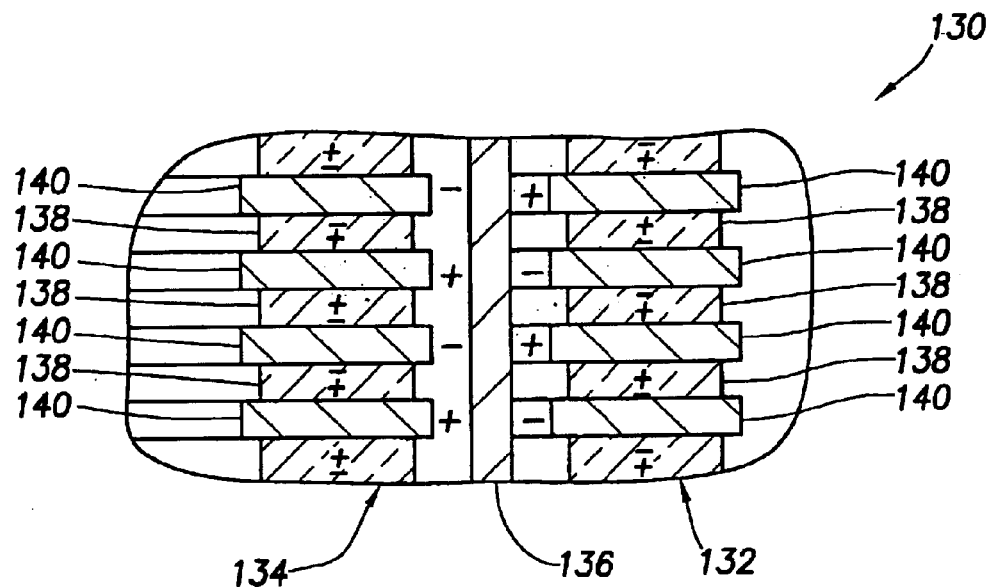
FIG. 9 is an enlarged cross-sectional view of a magnetic coupling embodying principles of the invention.
Figure 10:
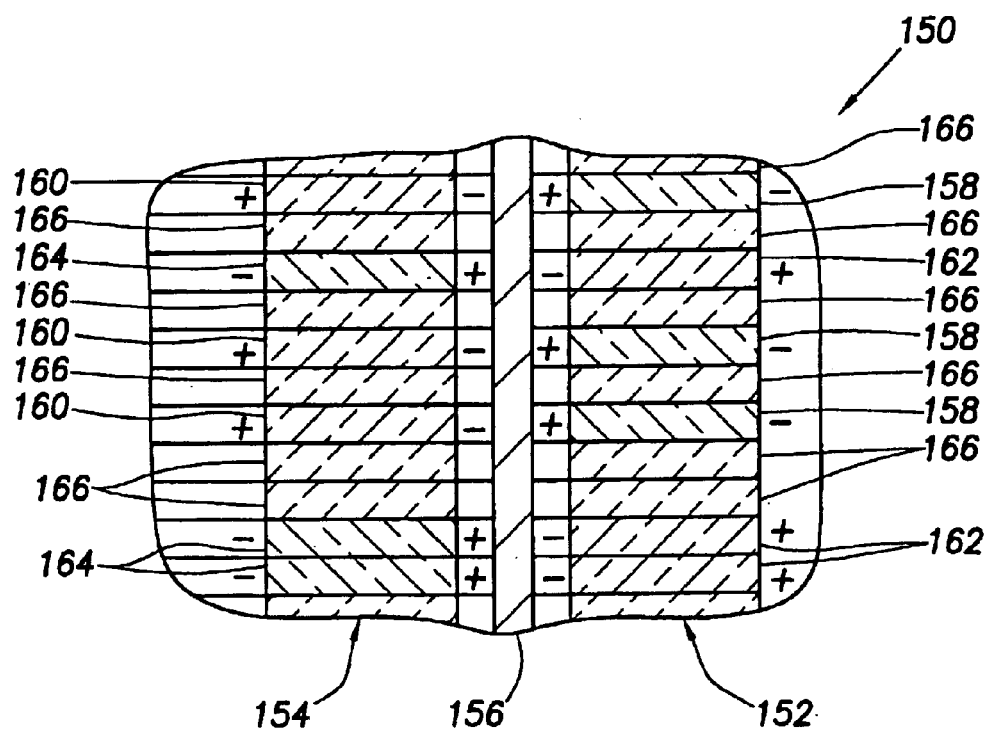
FIG. 10 is an enlarged cross-sectional view of another magnetic coupling embodying principles of the invention.

Any combination of magnets and/or magnetically reactive materials or devices may be used for each of the magnets 54, 56. Thus, any types of magnetic devices may be used in the magnetic coupling 52 in keeping with the principles of the invention. Further examples of magnetic couplings which may be used in the safety valve 12 or any other type of well tools are illustrated in FIGS. 9 & 10.

The opening prong 48 is an example of an operating member which may be displaced to actuate a well tool, such as the safety valve 12. Other types of operating members, such as sliding sleeves, setting mandrels, etc. may be displaced by use of the magnetic coupling 52 in keeping with the principles of the invention.

As depicted in FIGS. 2A–E, hydraulic pressure in the control line 18 has been increased to apply a sufficient differential pressure across the piston 32 to displace the piston downwardly against the force exerted by the spring 40. As the piston 32 displaces downward, the magnets 56 displace downward as well, causing the magnets 54 to displace downward, thereby also displacing the opening prong 48 downward and opening the flapper 42.

Note that the differential pressure used to displace the piston 32 is between pressure in the control line 18 and pressure in the annulus 38. Pressure in the tubing string 14 does not act on the piston 32. Therefore, pressure fluctuations in the tubing string 14 do not have to be considered in the pressure rating of the control line 18.

Annulus pressure is readily controllable. And, since the differential pressure across the piston 32 mainly has to overcome only the biasing force of the spring 40 to displace the piston downward, the pressure rating of the control line 18 may be less than that needed for other conventional deep set safety valves. For example with some conventional safety valves, in the event gas is produced, the spring must supply sufficient force to displace the piston and opening prong upward, pushing the fluid in the control line upward against its hydrostatic pressure, with relatively low pressure in the tubing string to assist.

In the safety valve 12, the spring 40 is able to more easily displace the piston 32 upward against the force produced by the differential between control line pressure and pressure in the annulus 38. This annulus pressure is available and substantially constant throughout the use of the safety valve 12 in the well 16, and so the spring 40 does not have to be designed to work without its assistance. Thus, the pressure applied to the control line 18 to actuate the safety valve 12 may be significantly less than that used to actuate a conventional deep set safety valve.

Furthermore, note that the opening prong 48 is pressure-balanced and is pressure isolated from the chambers 30, 34 containing the pressures used to actuate the safety valve 12. As used herein, the term "pressure-balanced" is used to indicate that the fluid pressures acting on a member or assembly produces no net biasing force. Some conventional safety valves use dynamic seals to provide pressure isolation between pressure in the tubing string and, for example, pressure in the control line. However, it is well known that dynamic seals are generally more susceptible to leakage than static seals or rigid barriers, and so it is desirable to reduce or eliminate dynamic seals in a safety valve.

As used herein, the term "dynamic seal" is used to indicate seals which provide pressure isolation between members which have relative displacement therebetween, for example, a seal which seals against a displacing surface, or a seal carried on one member and sealing against the other member, etc. A dynamic seal may be elastomeric or resilient, nonelastomeric, metal, composite, rubber, or made of any other material. A dynamic seal may be attached to each of the relatively displacing members, such as a bellows or a flexible membrane. A dynamic seal may be attached to neither of the relatively displacing members, such as a floating piston.

In the safety valve 12, a rigid tubular barrier 58 separates the flow passage 44 from the chambers 30, 34. No dynamic seal is used between the opening prong 48 and the piston 32. That is, displacement of the piston 32 is translated into displacement of the opening prong 48, with no dynamic seal being used therebetween. Instead, the magnetic coupling 52 permits translation of the piston 32 displacement to the opening prong 48 across the barrier 58, with complete pressure isolation therebetween, and without any dynamic seals.

The piston 32 does include dynamic seals 60, 62, but the differential pressure across these seals is relatively low, as described above. The seals 60, 62 must only seal against a pressure differential between the control line 18 and the annulus 38. The hydrostatic pressure in the control line 18 and in the annulus 38 will in most circumstances be approximately equal, and so only a relatively small amount of pressure will be applied to the control line to actuate the safety valve 12.

Figure 3A:
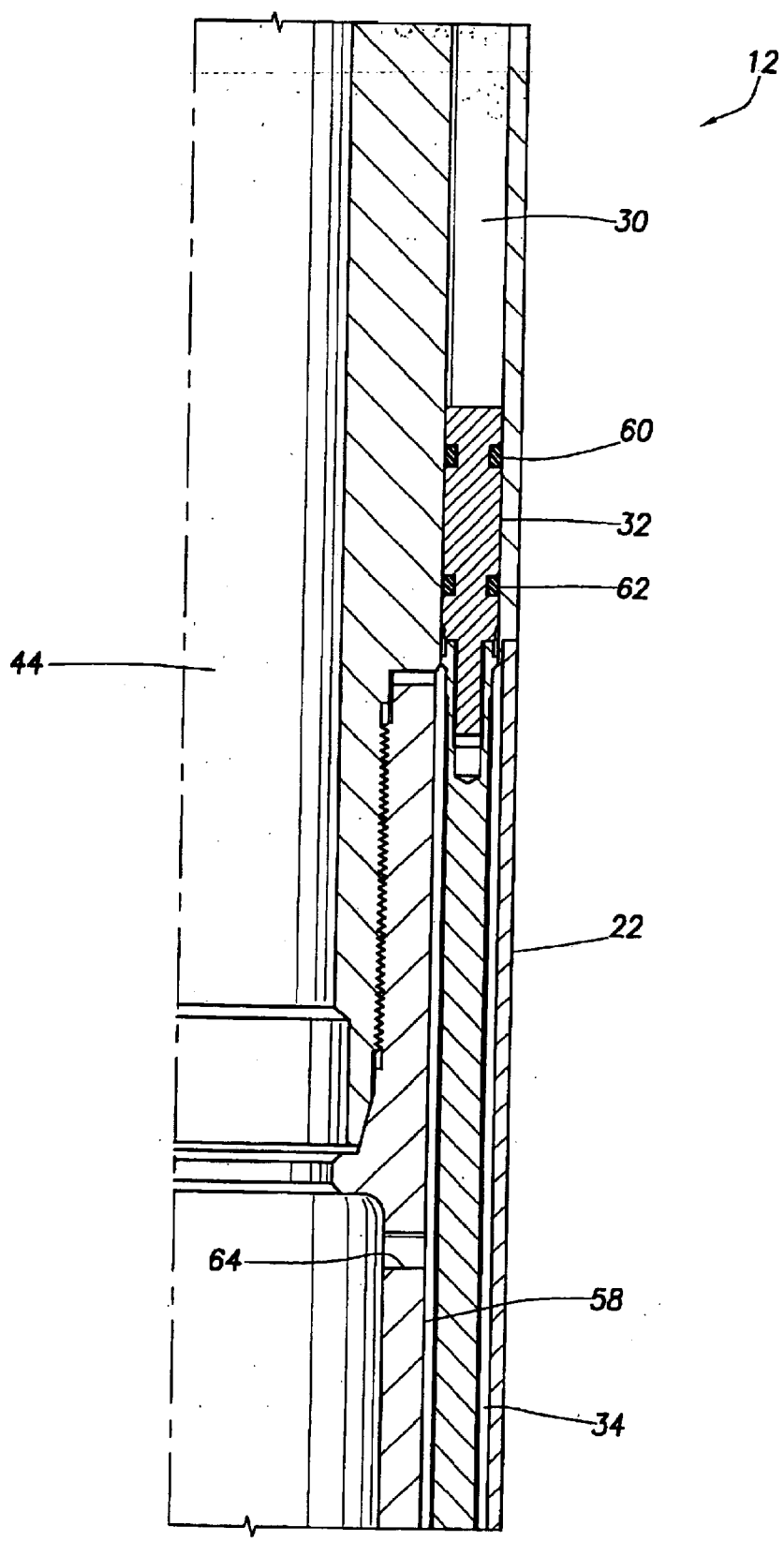
FIGS. 3A & B are quarter-sectional views of a first alternate construction of the safety valve of FIG. 2.
Figure 3B:
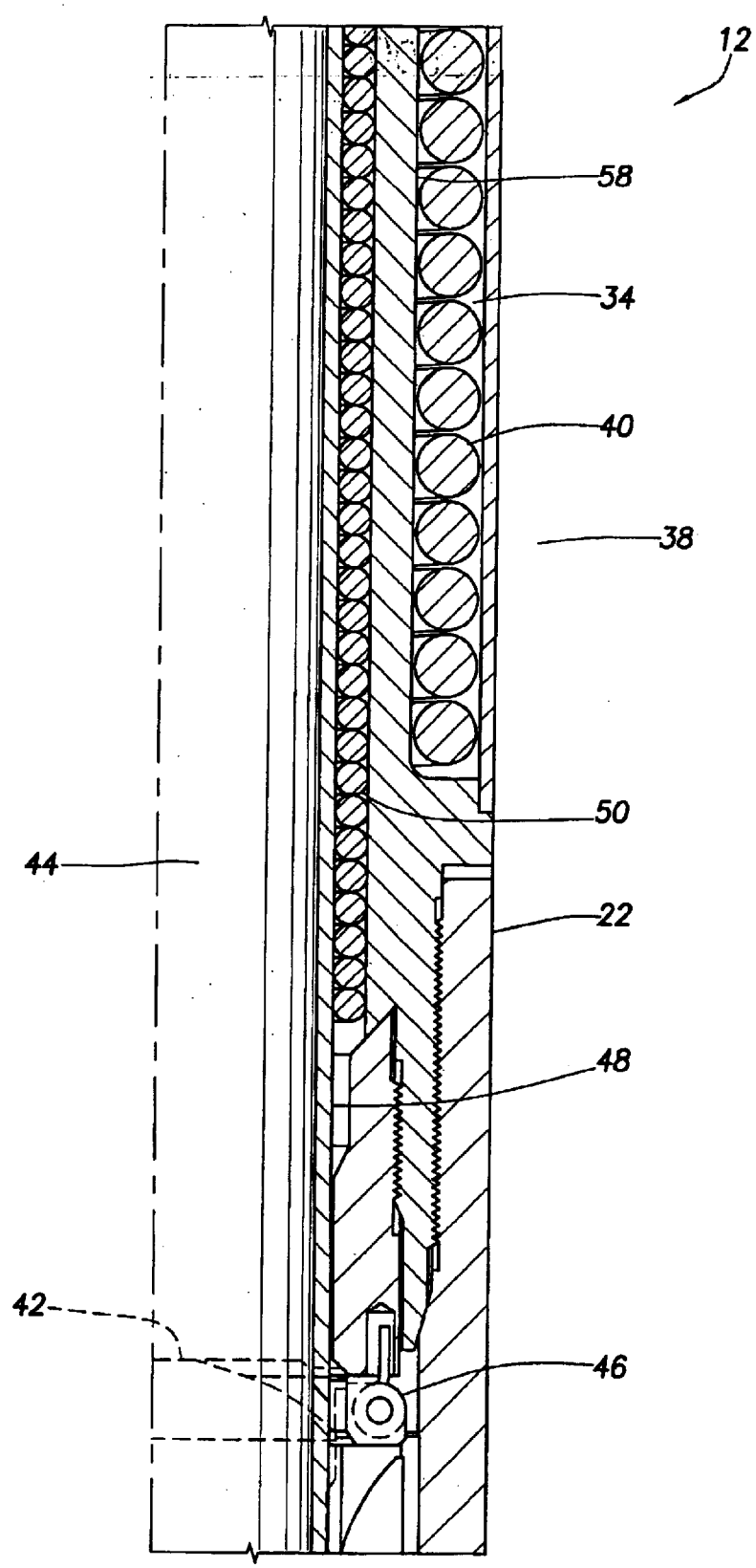

Referring additionally now to FIGS. 3A & B, an alternate construction of the safety valve 12 is representatively illustrated. In this alternate construction, the chamber 34 is in communication with the internal flow passage 44, instead of the annulus 38. FIG. 3A is substantially similar to FIG. 2B, except that an opening 64 provides communication between the flow passage 44 and the chamber 34. FIG. 3B is substantially similar to FIG. 2D, except that there is no opening 36 providing communication between the annulus 38 and the chamber 34.

Thus, the piston 32 in the alternate construction of the safety valve 12 depicted in FIGS. 3A & B displaces in response to a differential between pressure in the control line 18 and pressure in the passage 44. This demonstrates use of the principles of the invention in a safety valve which is actuated differently from the embodiment shown in FIGS. 2A–E. Note that the safety valve 12 as depicted in FIGS. 3A & B still has no dynamic seals between the piston 32 and the opening prong 48.

Figure 4:
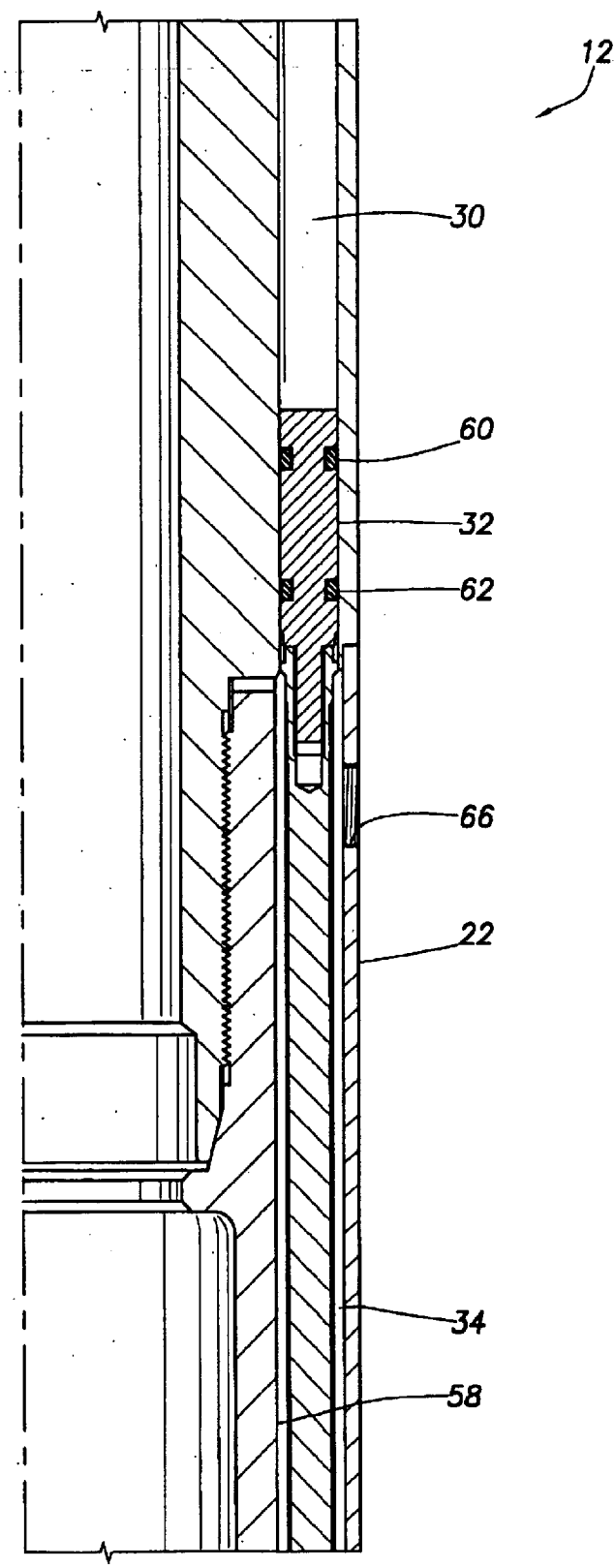
FIG. 4 is a quarter-sectional view of a second alternate construction of the safety valve of FIG. 2.

Referring additionally now to FIG. 4, another alternate construction of the safety valve 12 is representatively illustrated. FIG. 4 is substantially similar to FIG. 2B, except that a port 66 is provided through the outer housing 22 for connection of a second control line thereto (such as another control line 18). In this alternate construction, the chamber 34 is in communication with the second control line 18, and the chamber is isolated from the annulus 38 (as depicted in FIG. 3B).

Thus, the piston 32 in the embodiment of the safety valve 12 shown in FIG. 4 displaces in response to a differential between the pressures in the two control lines 18. The pressure differential between the control lines 18 is increased or decreased to displace the piston 32. Note that no dynamic seals are used between the piston 32 and the opening prong 48, and a relatively low pressure differential may be used to overcome the biasing force of the spring 40, as in the embodiment depicted in FIGS. 2A–E.

The embodiments of the safety valve 12 shown in FIGS. 2A–E, FIGS. 3A & B and FIG. 4 demonstrate that principles of the invention may be incorporated into any type of safety valve. These principles may also be incorporated into other types of well tools. Representatively illustrated in FIGS. 5–8 are a packer 70, a sliding sleeve valve 80, an interval control valve or choke 90 and a perforating apparatus 100. However, it should be understood that these are merely given as examples, and any type of well tool may incorporate principles of the invention.

Figure 5:
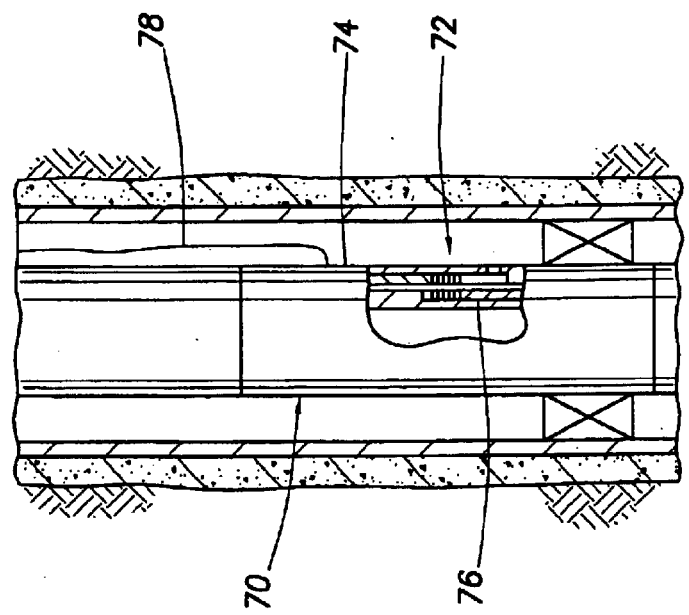
FIG. 5 is a partially cross-sectional view of a packer and method of actuation embodying principles of the invention.

In the packer 70 depicted in FIG. 5, a magnetic coupling 72 is used to translate displacement from a hydraulic actuator 74 to a setting mandrel 76 used to set the packer (i.e., outwardly extend sealing elements and/or anchoring slips of the packer). The actuator 74 may be similar to the piston 32 and chambers 30, 34 used in the safety valve 12, in which the piston displaces in response to pressure in a control line 78 connected to the actuator, although another type of actuator may be used instead. Note that there are no dynamic seals between the actuator 74 and the setting mandrel 76.

Figure 6:
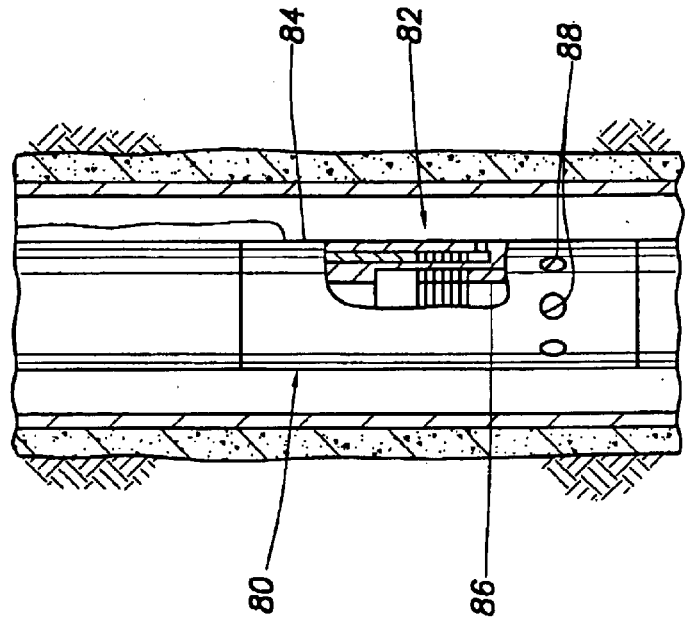
FIG. 6 is a partially cross-sectional view of a sliding sleeve valve and method of actuation embodying principles of the invention.

In the sliding sleeve valve 80 depicted in FIG. 6, a magnetic coupling 82 is used to translate displacement from a hydraulic actuator 84 to a sliding sleeve 86. Displacement of the sliding sleeve 86 is used to selectively permit and prevent flow through openings 88 formed laterally through the valve 80. The sleeve 86 is pressure-balanced, and no dynamic seal is used between the sleeve and the hydraulic actuator 84.

Figure 7:
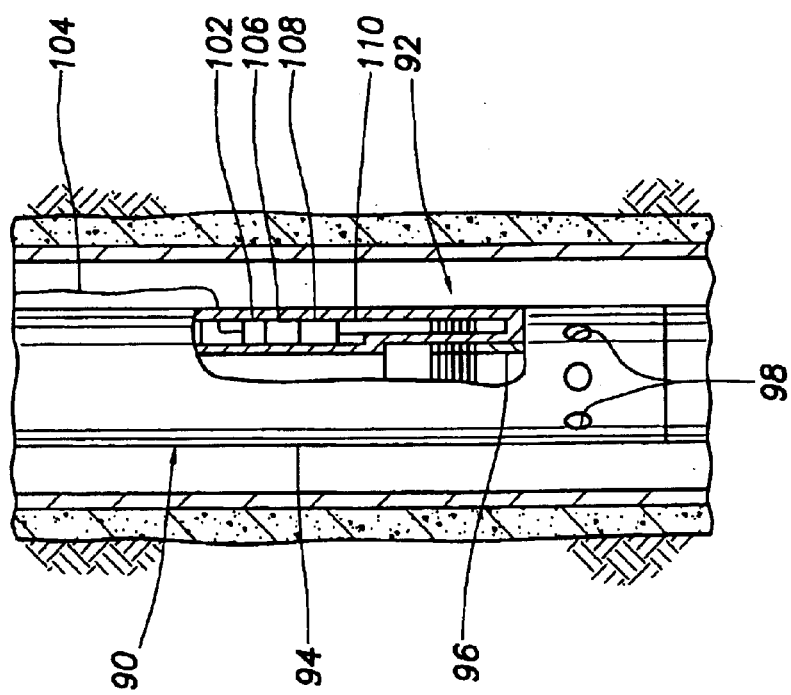
FIG. 7 is a partially cross-sectional view of a choke and method of actuation embodying principles of the invention.

In the choke 90 depicted in FIG. 7, a magnetic coupling 92 is used to translate displacement between an electrical actuator 94 and a choke sleeve 96. As the choke sleeve 96 is progressively raised or lowered, flow through openings 98 is progressively increased or decreased, to thereby regulate flow between a tubing string and a production or injection zone. The electrical actuator 94 may include a communications module 102 to provide communication with an electrical line 104, an electric motor 106, a freewheeling clutch 108, and a ball-screw 110 to convert motor rotation into linear displacement. The actuator 94 displaces one or more magnetic devices of the magnetic coupling 92, and other magnetic devices attached to the choke sleeve 96 displace therewith, thereby displacing the choke sleeve and regulating flow through the choke 90.

Of course, in place of the electric line 104, telemetry may be used for communication between the choke 90 and a remote location. In addition, a downhole power source, such as a battery or a downhole power generator, may be used to provide power to the actuator 94. Power to operate the actuator 94 may also be incorporated into a telemetry system, such as electromagnetic telemetry or pressure pulse telemetry.

Figure 8:
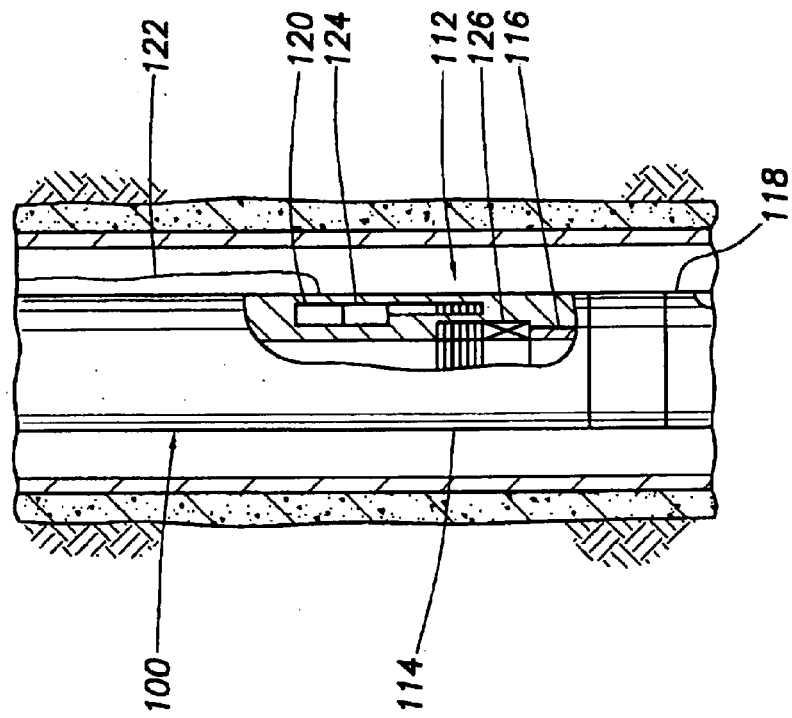
FIG. 8 is a partially cross-sectional view of a perforating apparatus and method of actuation embodying principles of the invention.

The perforating apparatus 100 depicted in FIG. 8 uses a magnetic coupling 112 to translate rotation from an electrical actuator 114 to a mandrel 116 attached to a perforating gun assembly 118. The apparatus 100 may be used to rotationally orient the gun assembly 118 in a well, so that it shoots in a desired direction. A communication module 120 provides for communication between an electric line 122 and a motor 124.

Note that the mandrel 116 may be pressure balanced, with no dynamic seals between it and the actuator 114, so that bearings 126 used to rotationally connect the gun assembly 118 to the apparatus 100 only support the weight of the gun assembly, and do not need to resist any force due to a pressure differential between the actuator and the mandrel.

Each of the motors 106, 124 described above is an electric motor, but it should be understood that any type of motor may be used to displace an actuator member in keeping with the principles of the invention. For example, hydraulic, pneumatic, fuel cell, chemical, linear, rotary, and other types of motors may be used.

Referring additionally now to FIG. 9, a magnetic coupling 130 for a well tool embodying principles of the invention is representatively illustrated. The magnetic coupling 130 includes an outer annular shaped magnetic device 132 coupled to an inner annular shaped magnetic device 134. Pressure exposed to the outer magnetic device 132 is isolated from pressure exposed to the inner magnetic device 134 by a rigid pressure isolation barrier 136.

Each of the outer and inner magnetic devices 132, 134 includes a stack of alternating layers of magnets 138 and magnetically reactive material layers 140. In each of the magnetic devices 132, 134, polarities of the magnets 138 are axially aligned, but are reversed between alternating magnets in each stack, so that the same magnet polarity faces each side of each of the layers 140. Thus, each of the layers 140 has induced in it a magnetic polarity opposite to that of adjacent layers 140 in the same stack.

In addition, each of the layers 140 has induced in it a magnetic polarity opposite to that of the layer 140 on the opposite side of the barrier 136. In this manner, the magnetic devices 132, 134 are magnetically attracted to each other. Displacement of the magnetic device 132 will be translated into displacement of the magnetic device 134 across the barrier 136.

Furthermore, the opposing polarities of adjacent layers 140 in the opposing stacks operate to prevent relative displacement between the magnetic devices 132, 134 with the additional force of magnetic repulsion between the same polarities in the stacks. For example, the positive polarity layers 140 in the outer magnetic device 132 are repelled from displacing toward the positive polarity layers 140 in the inner magnetic device 134. Therefore, a magnetic pattern in the outer magnetic device 132, and a magnetic pattern in the inner magnetic device 134 may be used to prevent relative displacement between the devices, by magnetic attraction or by magnetic repulsion between the magnetic patterns.

Referring additionally now to FIG. 10, another magnetic coupling 150 which may be used in a well tool embodying principles of the invention is representatively illustrated. The magnetic coupling 150 demonstrates other methods which may be used to create magnetic patterns in magnetic devices 152, 154 separated by a pressure barrier 156. However, it should be understood that, as with other well tools 12, 20, 70, 80, 86, 100 described herein, it is not necessary for a pressure barrier to separate magnetic devices of a magnetic coupling in keeping with the principles of the invention.

In the magnetic coupling 150, magnetic polarities and spacings and sequences between these polarities are used to create the magnetic patterns which translate displacement of the outer magnetic device 152 to displacement of the inner magnetic device 154, without relative displacement between the magnetic devices.

The outer magnetic device 152 includes annular shaped magnets 158 having radially aligned magnetic polarities, positive in the radially inward direction, and negative in the radially outward direction. These magnets 158 are axially aligned with magnets 160 in the inner magnetic device 154, which also have radially aligned magnetic polarities, but oppositely directed (negative in the radially inward direction, and positive in the radially outward direction). Thus, the magnets 158, 160 attract each other.

The outer magnetic device 152 further includes annular shaped magnets 162 having radially aligned magnetic polarities, negative in the radially inward direction, and positive in the radially outward direction. The magnets 162 are axially aligned with magnets 164 in the inner magnetic device 154, which also have radially aligned magnetic polarities, but oppositely directed (positive in the radially inward direction, and negative in the radially outward direction). Thus, the magnets 162, 164 attract each other.

The magnets 158, 160, 162, 164 are spaced apart in the respective outer and inner magnetic devices 152, 154 by spacers 166. The spacers 166 are preferably made of a magnetically nonreactive material, such as aluminum, composite material, etc. In the magnetic coupling 150, the spacers 166 may have any thickness, spacers in a magnetic device may have different thicknesses, and any combination of spacers may be used to space apart the magnets 158, 160, 162, 164 to create any magnetic pattern.

The magnets 158, 162 in the outer magnetic device 152 are repelled by the same polarity magnets 160, 164 in the inner magnetic device 154. Additionally, the nonuniform magnetic pattern created by the magnets 158, 160, 162, 164 and spacers 166 prevent misalignment of the magnetic devices 152, 154. Preferably, the magnetic pattern is constructed so that the magnetic attraction and magnetic repulsion between the magnets 158, 160, 162, 164 acts to prevent relative displacement therebetween.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A well tool, comprising:
   an actuator including a piston which displaces in response to a first pressure applied to the piston;
   an operating member which displaces to operate the well tool, the operating member having a second pressure applied thereto; and
   a magnetic coupling including at least one first magnet attached to the piston and at least one second magnet attached to the operating member,
   displacement of the piston being translated into displacement of the operating member while the first and second pressures are isolated from each other, without the use of any dynamic seal isolating the first pressure from the second pressure.

2. The well tool according to claim 1, wherein each of the first and second magnets is a permanent magnet.

3. A method of actuating a well tool in a well, the method comprising the steps of:
   displacing an actuator member of the well tool, the actuator member being exposed to a first pressure, and the well tool having a flow passage for flow of fluid therethrough;
   translating displacement of the acutator member to displacement of an operating member by use of a magnetic coupling therebetween, the operating member being exposed to a second pressure, the first and second pressures being isolated from each other; and
   actuating the well tool in response to displacement of the operating member.

4. The method according to claim 3, wherein in the translating step the magnetic coupling translates displacement from the actuator member to the operating member across a rigid pressure isolation barrier between the first and second pressures.

5. The method according to claim 3, wherein in the translating step the first and second pressures are isolated from each other without the use of any dynamic seal therebetween.

6. The method according to claim 3, wherein the displacing step the actuator member is exposed to a third pressure, the actuator member displacing in response to a differential between the first and third pressures.

7. The method according to claim 6, wherein the displacing step the first and third pressures are each isolated from the second pressure, without the use of any dynamic seal.

8. The method according to claim 6, wherein in the displacing step the first pressure is pressure in a first line connected to the actuator, and the third pressure is pressure in a second line connected to the actuator.

9. The method according to claim 6, wherein in the displacing step the first pressure is pressure in a first line connected to the actuator, and the third pressure is pressure in an annulus surrounding the well tool.

10. The method according to claim 6, wherein in the displacing step the first pressure is pressure in a first lines connected to the actuator, and the third pressure is pressure in a chamber of compressed gas.

11. A well tool, comprising:
a flow passage for flow of fluid therethrough;
an actuator;
at least one first magnetic device positioned in a first portion of the well tool at a first pressure, and the actuator displacing the first magnetic device;
at least one second magnetic device positioned in a second portion of the well tool at a second pressure, and the well tool being operated in response to displacement of the operating member; and
a pressure barrier isolating the first and second pressures, and displacement of the first magnetic device on a first side of the barrier causing displacement of the second magnetic device on a second side of the barrier.

12. The well tool according to claim 11, wherein the first pressure is pressure in a line connected to the actuator.

13. The well tool according to claim 11, wherein the second pressure is pressure in an internal flow passage formed axially through the well tool.

14. The well tool according to claim 11, wherein the first pressure is pressure in an annulus surrounding the well tool.

15. The well tool according to claim 11, wherein the first pressure is pressure in a chamber containing compressed gas.

16. The well tool according to claim 11, wherein the well tool is a safety valve.

17. The well tool according to claim 16, wherein the operating member is an opening prong of the safety valve.

18. The well tool according to claim 11, wherein the well tool is sliding sleeve valve.

19. The well tool according to claim 18, wherein the operating member is a sliding sleeve of the valve.

20. The well tool according to claim 11, wherein the well tool is a packer.

21. The well tool according to claim 20, wherein the operating member is a setting mandrel of the packer.

22. The well tool according to claim 11, wherein the actuator is a rotational actuator, and wherein rotation of the first magnetic device by the actuator causes by corresponding rotation of the second magnetic device and operating member.

23. The well tool according to claim 11, wherein the first pressure is isolated from the second pressure without use of any dynamic seal.

24. The well tool according to claim 11, wherein the first pressure is isolated from the second pressure without use of any dynamic seal.

25. The well tool according to claim 11, wherein the actuator displaces the first magnetic device in response to a pressure differential in the actuator.

26. The well tool according to claim 11, wherein the actuator displaces the first magnetic device in response to operation of a motor in the actuator.

27. The well tool according to claim 11, wherein the actuator displaces the first magnetic device in response to a differential between the first pressure and a third pressure applied to the actuator.

28. The well tool according to claim 27, wherein the third pressure is pressure in a line connected to the actuator.

29. The well tool according to claim 28, wherein the first pressure is pressure in an annulus surrounding the well tool.

30. The well tool according to claim 29, wherein the second pressure is pressure in a tubular string in which the well tool is interconnected.

31. The well tool according to claim 30, wherein the tubular string pressure is isolated from the line pressure and from the annulus pressure, without use of any dynamic seal.

32. The well tool according to claim 11, wherein the actuator displaces the first magnetic device in response to pressure in a line connected to the actuator, the line pressure being isolated from the second pressure.

33. The well tool according to claim 32, wherein the line pressure is isolated from the second pressure without use of any dynamic seal.

34. The well tool according to claim 11, wherein the actuator displaces the first magnetic device in response to a differential between pressure in an annulus surrounding the well tool and pressure in a line connected to the actuator.

35. The well tool according to claim 24, wherein the line pressure and the annulus pressure are isolated from the second pressure without use of any dynamic seal.

36. The well tool according to claim 35, wherein the second pressure is pressure in a tubing string in which the well tool is interconnected.

37. The well tool according to claim 35, wherein the first pressure is the annulus pressure.

38. The well tool according to claim 11, wherein the operating member is a closure member of a valve.

39. A well tool, comprising:
a flow passage for flow of fluid therethrough;
an actuator for displacing an actuator member of the well tool;
an operating member which is displaced to operate the well tool; and
a magnetic coupling between the actuator member and the operating member, the magnetic coupling including first and second magnetic devices, the first magnetic device being connected to the actuator member, and the second magnetic device being connected to the operating member, the first and second magnetic devices being on opposite sides of a pressure barrier.

40. A well tool, comprising:
a flow passage for flow of fluid therethrough;
an actuator for displacing an actuator member of the well tool;
an operating member which is displaced to operate the well tool; and
a magnetic coupling between the actuatir member and the operating member, the magnetic coupling including first and second magnetic devices, the first magnetic device being connected to the actuator member; and the second magnetic device being connected to the operating member, the first and second magnetic devices being pressure isolated from each other without the use of a dynamic seal.

41. A well tool, comprising:
a flow passage for flow of fluid therethrough;
an actuator for displacing an actuator member of the well tool;
an operating member which is displaced to operate the well tool; and
a magnetic coupling between the actuator member and the operating member, the magnetic coupling including first and second magnetic devices, the first magnetic device being connected to the actuator member, and the second magnetic device being connected to the operating member, the first magnetic device including a first series of magnets having polarities opposite to a second series of magnets in the second magnetic device.

42. A well tool, comprising:

a flow passage for flow of fluid therethrough;

an actuator for displacing an actuator member of the well tool; and an operating member which is displaced to operate the well tool; and a magnetic coupling between the actuator member and the operating member, the magnetic coupling including first and second magnetic devices, the first magnetic device being connected to the actuator member, and the second magnetic device being connected to the operating member, each of the first and second magnetic devices including magnets having axially aligned polarities.

43. A well tool, comprising:

a flow passage for flow of fluid therethrough;

an actuator for displacing an actuator member of the well tool;

an operating member which is displaced to operate the well tool; and a magnetic coupling between the actuator member and the operating member, the magnetic coupling including first and second magnetic devices, the first magnetic device being connected to the actuator member, and the second magnetic device being connected to the operating member, each of the first and second magnetic devices including magnets having radially aligned polarities.

44. A well tool, comprising:

a flow passage for flow of fluid therethrough;

an actuator for displacing an actuator member of the well tool;

an operating member which is displaced to operate the well tool; and a magnetic coupling between the actuator member and the operating member, the magnetic coupling including first and second magnetic devices, the first magnetic device being connected to the actuator member, and the second magnetic device being connected to the operating member, each of the first and second magnetic devices including magnets having opposing polarity directions, so that the magnets in each of the first and second magnetic devices are attracted to oppositely directed polarity magnets in the other first and second magnetic devices.

45. A well tool, comprising:

a flow passage for flow of fluid therethrough;

an actuator for displacing an actuator member of the well tool;

an operating member which is displaced to operate the well tool; and a magnetic coupling between the actuator member and the operating member, the magnetic coupling including first and second magnetic devices, the first magnetic device being connected to the actuator member, and the second magnetic device being connected to the operating member, each of the first and second magnetic devices including magnets having opposing polarity directions, so that the magnets in each of the first and second magnetic devices are repelled by similarly directed polarity magnets in the other of the first and second magnetic devices.

46. A well tool, comprising:

a flow passage for flow of fluid therethrough;

an actuator for displacing an actuator member of the well tool;

an operating member which is displaced to operate the well tool; and a magnetic coupling between the actuator member and the operating member, the magnetic coupling including first and second magnetic devices, the first magnetic device connected to the actuator member, and the second magnetic device being connected to the operating member, each of the first and second magnetic devices having a magnetic pattern, the magnetic patterns preventing relative displacement between the first and second magnetic devices.

47. The well tool according to claim 46, wherein the magnetic patterns are produced by varied spacings between magnets in the first and second magnetic devices.

48. The well tool according to claim 46, wherein the magnetic patterns are produced by varied polarity sequences between magnets in the first and second magnetic devices.

49. The well tool according to claim 48, wherein the varied polarity sequences include alternating magnet polarities in the first and second magnetic devices.

50. A method of completing a well, the method comprising steps of:

positioning a well tool in the well;

displacing an actuator member of the well tool; and translating displacement of the actuator member to displacement of an operating member of the well tool, the translation being performed across a pressure isolation barrier without use of any dynamic seal, and the translating step being performed using a magnetic coupling between the actuator member and the operating member.

51. A method of completing a well, the method comprising the steps of:

positioning a well tool in the well;

displacing an actuator member of the well; and translating displacement of the actuator member to displacement of an operating member of the well tool, the translation being performed across a pressure isolation barrier without use of any dynamic seal, and the translating step further comprising displacing a first magnetic device operatively associated with the actuator member to thereby cause displacement of a second magnetic device operatively associated with the operating member.

52. A method of installing a tubular string in a well, the method comprising the steps of:

interconnecting in the tubular string a well tool including an actuator member;

positioning the tubular string in the well; and translating displacement of the actuator member to displacement of an operating member of the well tool, the translation being performed across a pressure isolation barrier without use of any dynamic seal, and the translating step being performed using a magnetic coupling between the actuator member and the operating member.

53. A method of installing a tubular string in a well, the method comprising the steps of:

interconnecting in the tubular string a well tool including an actuator member;

positioning the tubular string in the well; and translating displacement of the actuator member to displacement of an operating member of the wall tool, the translation being performed across a pressure isolation barrier without use of any dynamic seal, and the translating step further comprising displacing a first magnetic device operatively associated with the actuator member to thereby cause displacement of a second magnetic device operatively associated with the operating member.

54. A completion string for use in a well, the completion string comprising:

a well tool interconnected in the completion string, the well tool including an actuator member and an operating member, displacement of the actuator member being translatable into displacement of the operating member across a pressure barrier without use of any dynamic seal, and the well tool further including a magnetic coupling between the actuator member and the operating member.

55. A completion string for use in a well, the completion string comprising:

a well tool interconnected in the completion string, the well tool including an actuator member and an operating member, displacement of the actuator member being translatable into displacement of the operating member across a pressure barrier without use of any dynamic seal, and wherein a first magnetic device operatively associated with the actuator member causes displacement of a second magnetic device operatively associated with the operating member when displacement of the actuator member is translated into displacement of the operating member.

56. A method of completing a well, the method comprising the steps of:

positioning a well tool in the well;

displacing an actuator member of the well tool; and translating displacement of the actuator member into displacement of an operating member of the well tool using a magnetic coupling between the actuator member and the operating member, and performing the translating step across a pressure isolation barrier without use of any dynamic seal.

57. The method according to claim 56, wherein in the translating step, a pressure differential exists across the pressure isolation barrier.

58. A method of completing a well, the method comprising the steps of:

positioning a well tool in the well;

displacing an actuator member of the well tool; and translating displacement of the actuator member into displacement of an operating member of the well tool using a magnetic coupling between the actuator member and the operating member, and wherein in the translating step, the actuator member is exposed to a first pressure, and the operating member is exposed to a second pressure different from the first pressure, without use of any dynamic seal therebetween.

59. A method of installing a tubular string in a well, the method comprising the steps of:

interconnecting in the tubular string a well tool including an actuator member;

positioning the tubular string in the well; and translating displacement of the actuator member into displacement of an operating member of the well tool using a magnetic coupling between the actuator member and the operating member, and performing the translating step across a pressure isolation barrier without use of any dynamic seal.

60. The method according to claim 59, wherein in the translating step, a pressure differential exists across the pressure isolation barrier.

61. A method of installing a tubular string in a well, the method comprising the steps of:

interconnecting in the tubular string a well tool including an actuator member;

positioning the tubular string in the well; and translating displacement of the actuator member into displacement of an operating member of the well tool using a magnetic coupling between the actuator member and the operating member, and wherein in the translating step, the actuator member is exposed to a first pressure, and the operating member is exposed to a second pressure different from the first pressure, without use of any dynamic seal therebetween.

62. A completion string for use in a well, the completion string comprising:

a well tool interconnected in the completion string, the well tool including an actuator member, an operating member, and a magnetic coupling, displacement of the actuator member being translatable into displacement of the operating member using the magnetic coupling, and the well tool further including a pressure isolation barrier between the actuator member and the operating member, displacement of the actuator member being translatable into displacement of the operating member across the pressure isolation barrier without use of any dynamic seal.

63. The completion string according to claim 62, wherein a pressure differential exists across the pressure isolation barrier when displacement of the actuator member is translated into displacement of the operating member.

64. A completion string for use in a well, the completion string comprising:

a well tool interconnected in the completion string, the well tool including an actuator member, an operating member, and a magnetic coupling, displacement of the actuator member being translatable into displacement of the operating member using the magnetic coupling, and wherein the actuator member is exposed to a first pressure, and the operating member is exposed to a second pressure different from the first pressure, when displacement of the actuator member is translated into displacement of the operating member.

* * * * *

UNITED STATES PATENT AND TRADEMARK OFFICE
CERTIFICATE OF CORRECTION

PATENT NO. : 6,988,556 B2
APPLICATION NO. : 10/078839
DATED : January 24, 2006
INVENTOR(S) : James D. Vick, Jr.

It is certified that error appears in the above-identified patent and that said Letters Patent is hereby corrected as shown below:

In claim 6, column 10, line 55, insert --in-- between the words "wherein" and "the".

In claim 7, column 10, line 59, insert --in-- between the words "wherein" and "the".

In claim 10, column 11, line 4, delete "lines" and replace with --line--.

In claim 18, column 11, line 36, insert --a-- between the words "is" and "sliding".

In claim 22, column 11, line 45, delete the second occurrence of "by".

In claim 23, column 11, line 48, cancel the text beginning with "23. The well tool" to and ending "dynamic seal." in column 11, line 50, and insert the following claim:

23. The well tool according to claim 11, wherein the operating member is pressure-balanced.

In claim 35, column 12, line 18, delete "24" and replace with --34--.

In claim 40, column 12, line 48, delete "actuatir" and replace with --actuator--.

In claim 42, column 13, line 7, delete "and".

In claim 44, column 13, line 49, insert --of the-- between the words "other" and "first".

In claim 46, column 14, line 11, insert --being-- between the words "device" and "connected".

In claim 50, column 14, line 27, insert --the-- between the words "comprising" and "steps".

UNITED STATES PATENT AND TRADEMARK OFFICE
CERTIFICATE OF CORRECTION

PATENT NO. : 6,988,556 B2
APPLICATION NO. : 10/078839
DATED : January 24, 2006
INVENTOR(S) : James D. Vick, Jr.

It is certified that error appears in the above-identified patent and that said Letters Patent is hereby corrected as shown below:

In claim 51, column 14, line 41, insert --tool-- immediately following the word "well".

Signed and Sealed this

Twenty-ninth Day of August, 2006

JON W. DUDAS
*Director of the United States Patent and Trademark Office*